Figure 1:
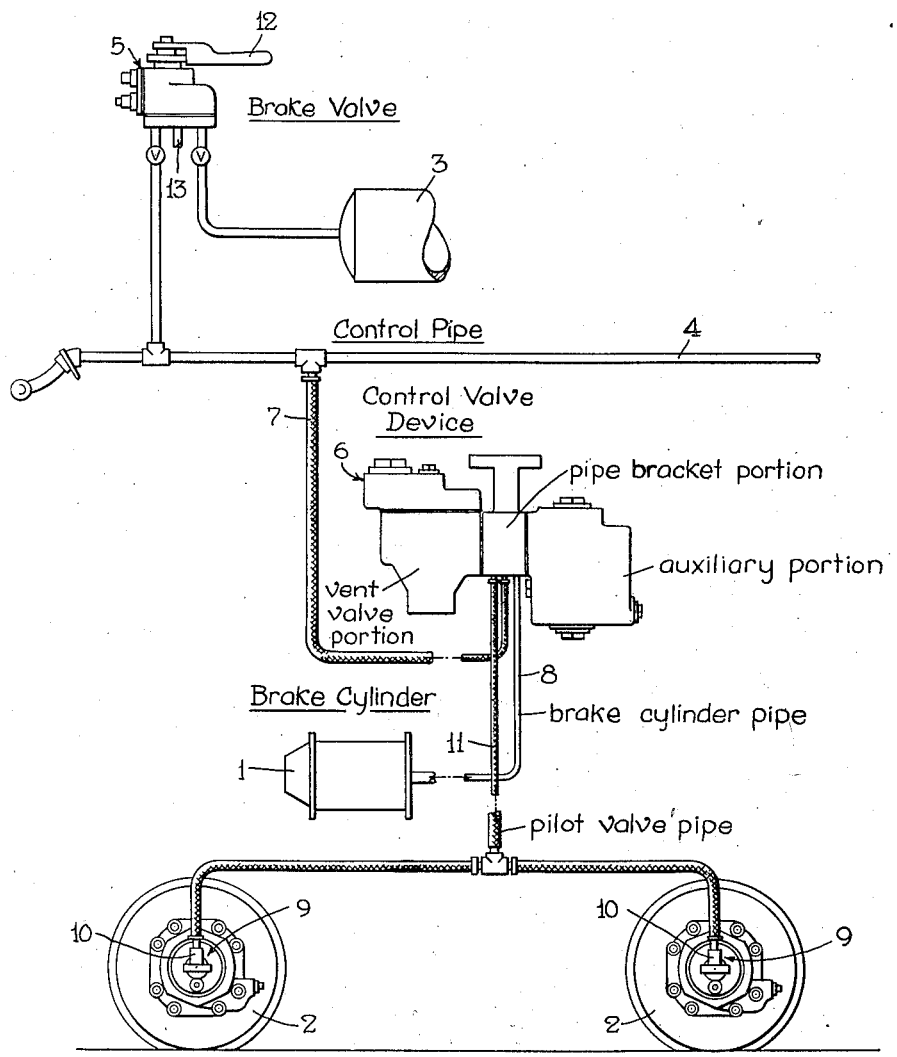

March 23, 1948.  A. A. STEINMILLER  2,438,423
CONTROL VALVE DEVICE
Filed Aug. 30, 1945  2 Sheets-Sheet 2

INVENTOR
Adelbert A. Steinmiller
BY
ATTORNEY

Patented Mar. 23, 1948

2,438,423

UNITED STATES PATENT OFFICE 2,438,423

CONTROL VALVE DEVICE

Adelbert A. Steinmiller, Wilkinsburg, Pa., assignor to The Westinghouse Air Brake Company, Wilmerding, Pa., a corporation of Pennsylvania Application August 30, 1945, Serial No. 613,673

9 Claims. (Cl. 303—21)

This invention relates to control valve devices and has particular relation to control valve devices of the type adapted especially for use in fluid pressure brake control systems on railway cars and trains for controlling the release of fluid under pressure from the brake cylinder and the subsequent resupply of fluid under pressure to the brake cylinder upon the occurrence of a slipping condition of the wheels for the purpose of preventing the sliding of the car wheels.

In heretofore known control valve devices of the type employed for effecting the release of fluid under pressure from a brake cylinder and the subsequent resupply of fluid under pressure to the brake cylinder in response to the occurrence of a slipping condition of the wheels, a pneumatic connection in the form of a flexible conduit or pipe is provided between the control valve device and a so-called "Decelostat" pilot valve carried in a casing attached to the outer end of the journal of a wheel-axle and operatively responsive to the occurrence of a slipping condition of the vehicle wheel. Whenever a slipping condition of the wheels is induced by reason of an excessive brake application, the pilot valve is operated to effect a reduction of the pressure in a control chamber of the control valve device thereby to initiate a sequence of operation of the control valve device for effecting a rapid release of fluid under pressure from the brake cylinder and subsequent resupply of fluid under pressure to the brake cylinder.

The so-called pilot valve pipe connecting the "Decelostat" pilot valve and the control valve device is subject to possible breakage or rupture due to striking an external object or due to ballast thrown up against the pilot valve pipe during travel of the train.

If the pilot valve pipe is broken during a brake application, the control valve device is operated responsively to effect a release of fluid under pressure from the brake cylinder which release is continued throughout the remainder of the brake application. Furthermore, so long as the pilot valve pipe continues broken or ruptured, the control valve device will operate promptly each time a brake application is effected to prevent the supply of fluid under pressure to the brake cylinder.

It is accordingly desirable to guard against the results described above and to insure the supply of fluid under pressure to the brake cylinder notwithstanding fracture or rupture of the pilot valve pipe.

This particular problem has been recognized heretofore, as evidenced by an arrangement proposed in the copending application, Serial No. 584,352 of Joseph C. McCune, filed March 23, 1945, now Patent No. 2,417,209, March 11, 1947, and assigned to the assignee of the present application, which arrangement insures against the undesired continued release of the brakes due to pilot valve pipe breakage.

It is an object of my present invention to provide an arrangement including a control valve device operating on an entirely different principle than that disclosed in the said McCune application for insuring application of the brakes, that is, supply of fluid under pressure to the brake cylinders of a railway car truck notwithstanding breakage or rupture of the pilot valve pipe.

It is another and more specific object of my present invention to provide an arrangement including a control valve device of the type referred to in the foregoing object which operates normally to reduce the pressure in the brake cylinder, in response to an initiatory reduction of pressure in the pilot valve pipe, to a certain low value and to resupply fluid under pressure to effect reapplication of the brakes within a certain operating time and characterized, according to my invention, by mechanism that functions automatically to cause fluid under pressure to be supplied to the brake cylinder to effect reapplication of the brakes should the resupply of fluid under pressure to the brake cylinder not be effected by the control valve device within said certain time due to breakage or rupture of the pilot valve pipe.

Figure 2:
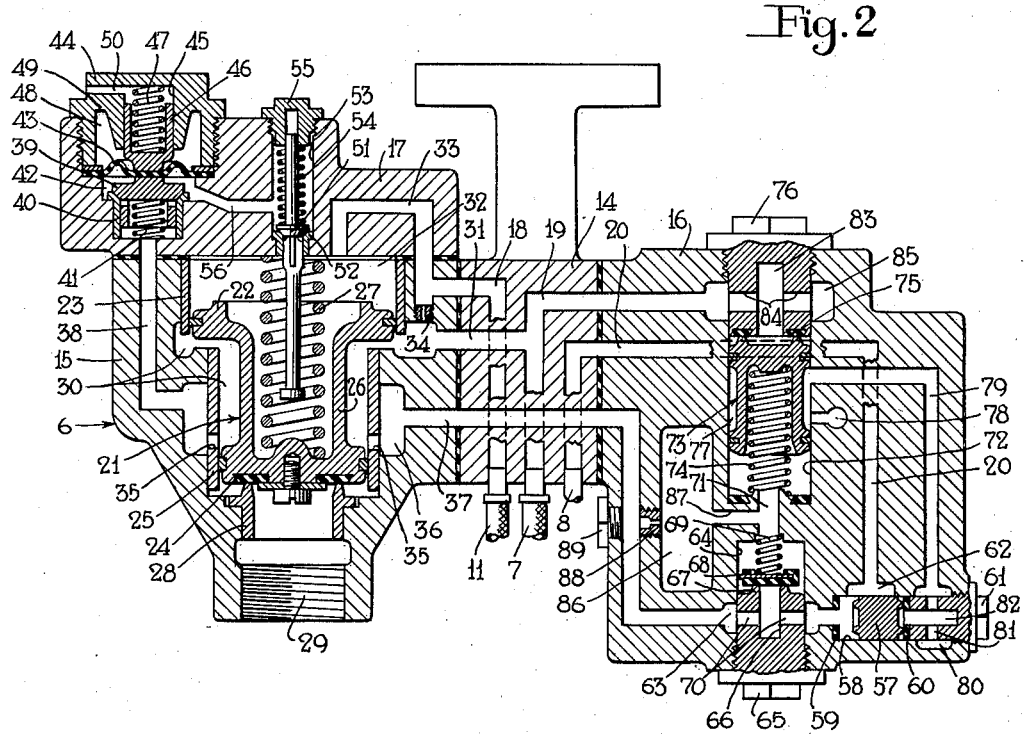
Figure 3:
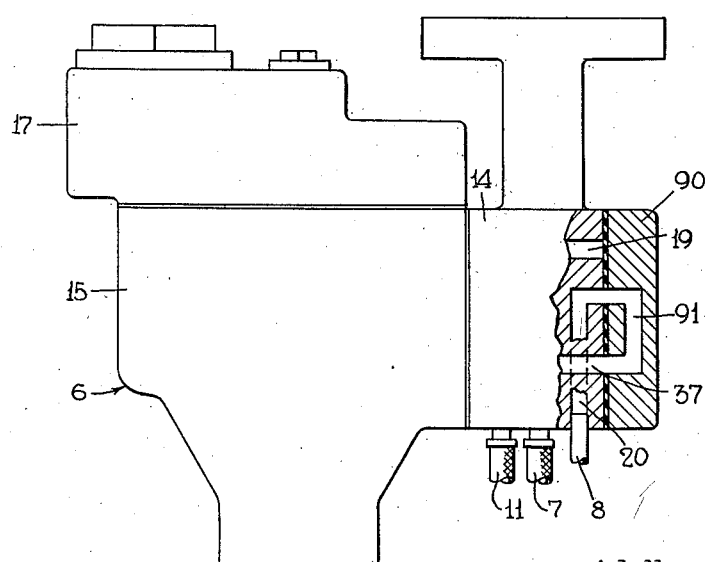

The above objects, and other objects of my invention which will be made apparent hereinafter, are attained by an embodiment of my invention described in detail in the subsequent description thereof and shown in the accompanying drawings wherein Figure 1 is a simplified diagrammatic view showing my improved control valve device and the manner of its use in connection with a fluid pressure brake control apparatus for railway cars and trains, Figure 2 is an enlarged vertical sectional view, with parts shown in one plane for clarity, showing the details of my improved control valve device, and Figure 3 is an outline view, partially in section, showing a cover plate substituted for a portion of the casing of the control valve device in Figure 2, whereby the functions inherent in the device of Figure 2 relative to insuring application of the brakes may be optionally eliminated.

Description

While my control valve device may be employed in various situations or types of mechanisms other than brake control apparatus, it is particularly designed for and useful in connection with brake control systems for railway cars and trains. By way of illustration, therefore, it is shown in Figure 1 and will be described herein in connection with a brake control apparatus but it should be understood that it is not so limited in its utility.

Referring to Figure 1, the brake system shown comprises a brake cylinder 1 operative upon the supply of fluid under pressure thereto to effect application of friction brakes to the wheels 2 of a wheel truck. For simplicity, only two wheels 2 are shown, it being understood that each of the wheels 2 shown is one of a pair that may be fixed at opposite ends of a connecting axle.

The brake control equipment further comprises a source of fluid under pressure, such as a reservoir 3, which is normally charged as by a fluid compressor not shown; a control pipe 4; and manually controlled mechanism, typified in simplified form by a brake valve 5, for controlling the supply of fluid under pressure from the reservoir 3 to the pipe 4 and the release of fluid under pressure from the pipe 4. A control valve device 6, constructed according to my invention, is interposed between the control pipe 4 and the brake cylinder 1, connections being made from the control pipe 4 to the control valve device through a branch pipe 7 of the control pipe and to the brake cylinder 1 through a so-called brake cylinder pipe 8.

Associated with each of the wheel and axle units is a so-called "Decelostat" or wheel slip detector 9 of the rotary inertia type, each "Decelostat" including a pilot valve device 10 carried on the outer end of the axle journal casing and connected to respective branches of a so-called pilot valve pipe 11 leading and connected to the control valve device 6.

Considering the parts of the equipment in greater detail, the brake valve 5 may be of the well known self-lapping type having an operating handle 12 secured to the outer end of a rotary operating shaft which is turned by rotation to control supply and release valve mechanism. In the normal or brake release position of the brake valve handle 12 fluid under pressure is vented to atmosphere from the control pipe 4 by way of the exhaust port and pipe 13 at the brake valve. When the brake valve handle 12 is shifted out of its brake release position into its application zone, the exhaust connection of the control pipe 4 is closed and a supply connection is opened between the reservoir 3 and the control pipe 4. The nature of the brake valve mechanism is such that the supply of fluid under pressure to the control pipe 4 is automatically terminated when a certain pressure is established corresponding substantially to the degree of displacement of the brake valve handle 12 out of its brake release position. Thus, the greater the degree of displacement of the brake valve handle out of its brake release position, the greater is the pressure established in the control pipe 4. The brake valve 5 also has a pressure-maintaining feature in that should the pressure in the control pipe tend to reduce from that corresponding to the degree of displacement of the brake valve handle out of its brake release position, the supply valve of the brake valve is automatically operated to cause fluid under pressure to be supplied to the control pipe to maintain a pressure therein corresponding to the position of the brake valve handle.

Under normal conditions communication is established, as hereinafter more fully explained, through the control valve device 6 between branch pipe 7 of the control pipe and the brake cylinder pipe 8 so that a fluid pressure is established in the brake cylinder corresponding to the pressure established in the control pipe 4, thereby causing a corresponding degree of application of the brakes on the car wheels 2.

The control valve device 6 comprises a sectionalized casing including a pipe bracket and mounting portion 14 having two substantially parallel faces on opposite sides thereof, to one of which faces a vent valve portion 15 is attached as by screws or bolts (not shown) with a suitable sealing gasket intervening, and to the other face of which an auxiliary portion 16 is attached as by screws or bolts (not shown) with a suitable sealing gasket intervening. The vent valve portion 15 has a cap portion 17 attached thereto, as by screws or bolts (not shown), with a suitable sealing gasket intervening.

The pipe bracket portion is provided with three passages 18, 19 and 20 terminating in ports to which the pilot valve pipe 11, the branch pipe 7 of the control pipe, and the brake cylinder pipe 8 are respectively connected.

The vent valve portion 15 and its cap section 17 embody valve mechanism substantially identical to that disclosed in the prior Patent 2,366,044 of Joseph C. McCune and such structure per se is not my invention.

Embodied in the vent valve portion is a differential piston valve device 21 comprising an annular piston 22 operative in a cylindrical bushing 23 secured in the casing section and a disc type piston valve 24, of smaller diameter, operative in a cylindrical bushing 25 of correspondingly smaller diameter than the bushing 23, the two bushings being coaxially related and the piston 22 and piston valve 24 being connected by a tubular stem 26.

A coil spring 27 extends through the stem 26 in interposed relation between the contact face of the cap section 17 and the inner face of the piston valve 24 and yieldingly urges the differential piston valve device 21 downwardly to a position in which the piston valve 24 seats on a seat rib formed on a seat bushing 28 that is secured in a bore or a vent port 29 in substantial coaxial relation to the bushings 23 and 25.

The annular chamber 30, formed in surrounding relation to the stem 26 and open to the inner face of the annular piston 22, is connected by a branch passage 31 to the passage 19 within the pipe bracket portion 14.

The chamber 32, formed within the bushing 23 at the outer face of annular piston 22, is connected by a passage 33 to the annular chamber 30. A choke fitting 34, having a restricted orifice, is interposed in the passage 33 at the point of entrance of the passage 33 into the chamber 30.

The passage 18 is connected into the passage 33 at a point between the choke fitting 34 and the chamber 32.

The bushing 25 has a plurality of peripherally spaced ports 35 to provide communication between the annular chamber 30 and an annular chamber 36 surrounding the bushing 25. A passage 37 leads out of the annular chamber 36 and extends through the pipe bracket portion 14 into the auxiliary portion 16, where it is adapted to be connected to the passage 20 in the manner hereinafter to be described.

The annular chamber 36 is also connected by a passage 38 to the inner seated area of a valve 39 of the poppet type, hereinafter sometimes referred to as the reduction control valve. The valve 39 seats on a cooperating valve seat formed at the end of a seat bushing 40 secured in the cap section 17, the valve having a suitably perforated tubular stem guided in the bushing 40. A coil spring 41 interposed between the cap section 17 and the inner face of the valve 39 tends to urge the valve upwardly to an unseated position.

The outer face of the valve 39 is open to a chamber 42 that is closed by a flexible diaphragm 43 suitably clamped along the periphery thereof by a screw plug 44.

The screw plug 44 contains a central boss on the interior thereof in which a bore 45 is formed. A cylindrical follower 46 is contained in and slidably operates in the bore 45, being biased downwardly to contact with the upper face of the diaphragm 43 by a coil spring 47 interposed between the cap nut 44 and the closed end of the cylindrical follower 46. The spring 47 is stronger than the spring 41 and maintains the valve 39 seated in opposition to the force of spring 41 in the absence of fluid pressure acting on the diaphragm in chamber 42.

The space within the screw plug 44 surrounding the boss on the interior thereof forms a chamber 48 to which the upper face of the diaphragm 43 is open. The chamber 48 is constantly open to atmosphere through a port 49 that communicates with an atmospheric exhaust port opening out of the bore 45, which port 50 constitutes also a breather port for the bore 45 to prevent dashpot action of the follower 46.

As explained more fully hereinafter, the differential piston valve device 21 is shiftable upwardly, in response to a reduction of the pressure of the fluid in the chamber 32, to a position in which the annular piston 22 engages the contact face of the cap section 17. In this position, the piston valve 24 is above the ports 35 in the bushing 25, thereby cutting off the communication between the annular chamber 30 and the annular chamber 36 and at the same time establishing a connection from the annular chamber 36 through the ports 35 to atmosphere through the exhaust port 29.

In the traverse of the piston valve device 21 to its upper position, a boss formed on the interior of the piston valve 24 engages the end of the stem of a poppet valve 51 which is normally seated on a seat bushing 52 carried in the cap section 17. The seat bushing 52 and the valve 51 are installed and removed through the outer end of a bore 53 in the cap section in which they are contained. A spring 54 that is interposed between the valve 51 and a screw plug 55 closing the outer open end of the bore 53 yieldingly urges the valve into seated position on the valve seat 52. A passage 56 connects the bore 53 to the chamber 42 at the lower face of the diaphragm 43.

As previously indicated, the passage 37 is normally connected in the auxiliary portion 16 of the control valve device to the passage 20 to which the brake cylinder pipe 8 is connected. As seen in Figure 2, this connection is established by a double check valve element 57 which operates slidably in a bore 58 between two axially spaced gasket seats 59 and 60.

The gasket seat 60 is secured on the inner end of a screw plug 61 screwed into the outer end of the bore 58. Gasket seat 59 is suitably secured at the base of the bore 58.

The passage 37 enters the inner end of the bore 58 through the central opening in the annular gasket seat 59. Thus, when fluid under pressure is supplied into the passage 37, the double check valve element 57 is shifted in a right-hand direction into seated relation on the gasket seat 60, thereby uncovering a cavity 62 to which the passage 20 is connected.

Interposed in the passage 37 in the auxiliary portion 16 is an annular chamber 63 intersected by a bore 64 opening at the lower face of the auxiliary portion 16. Screwed into the outer end of the bore 64 is a screw plug 65. The screw plug 65 has a central bore 66 surrounded at the outer end thereof by an annular seat rib 67 on which a disc type check valve 68 seats. The check valve 68 is provided in conventional manner with metallic inserts or guides which serve to center the valve in the bore 64 and guide it therein. A coil spring 69 interposed between the base of the bore 64 and the valve 68 yieldingly urges the valve into seated relation on the seat rib 67.

The central bore 66 in the plug 65 communicates with annular chamber 63 and the passage 37 through a plurality of ports 70.

The inner end of the bore 64 is connected through a passage 71 to the inner end of a coaxially disposed bore 72 that opens at the top face of the auxiliary portion 16.

A piston valve device 73 operates slidably in the bore 72 and is normally yieldingly biased by a coil spring 74 to an upper position in which an annular rib on the piston valve device seats in sealing relation on an annular gasket 75 that is secured on the inner end of a screw plug 76 screwed into the outer end of the bore 72.

The piston valve device 73 provides an annular cavity 77 through which communication is normally established between an exhaust port 78 and a passage 79. Passage 79 terminates in an annular cavity 80 that is connected through a plurality of ports 81 with a central bore 82 in screw plug 61. The bore 82 opens at the right-hand face of the double check valve element 57. It will be seen, therefore, that with the piston valve device 73 in its normal position, in which it is shown in Figure 2, the right-hand face of the double check valve element 57 is open to atmospheric pressure. Consequently, the valve element 57 is free to shift in the right-hand direction in response to the supply of fluid under pressure through the passage 37.

The screw plug 76 has a central bore 83 open to the inner seated area of the piston valve device 73 and communicating through a series of ports 84 with an annular cavity 85 to which the passage 19 is connected. It will thus be seen that when the control pipe 4 is charged with fluid under pressure, fluid at a corresponding pressure flows through the branch pipe 7, passage 19, chamber 85, ports 84 and bore 83 to act on the inner seated area of the piston valve device 73 and tends to shift the piston valve device downwardly in opposition to the yielding force of the spring 74.

With the piston valve device 21 of the vent valve portion 15 in its normal position as shown in Figure 2, however, fluid under pressure simultaneously supplied from the passage 19 through the passage 31, annular cavity 30, ports 35, annular cavity 36, passage 37, annular cavity 63, ports 70, bore 66, past the check valve 68 and through the passage 71 to the bore 72 at the back of the piston valve device 73, prevents build-up of a sufficient pressure differential on the piston valve device to effect the downward unseating movement of the piston valve device.

In order to provide additional volume at the back of the piston valve device 73 for a purpose hereinafter made apparent, a volume chamber 86 is provided in the auxiliary portion 16, which volume chamber communicates through a branch passage 87 with the passage 71 and thus with the bore 72 at the back of the piston valve 73.

The volume chamber 86 is also connected through a choke fitting 88, having a restricted orifice, with the passage 37. Choke fitting 88 is installed through an outer threaded opening in the casing section opposite the threaded opening in which the choke fitting is screwed. After the choke fitting is installed, a screw plug 89 is installed in the outer opening to effectually seal the opening.

The "Decelostats" or wheel slip detectors 9 may be of the rotary inertia type disclosed in the copending application Serial No. 533,284 of Joseph C. McCune and George K. Newell, filed April 29, 1944, and assigned to the assignee of the present application. Since reference may be had to the copending application for details of the "Decelostat" it is deemed unnecessary to further describe these devices other than to point out that they comprise essentially a fly-wheel element which is effective in response to acceleration or deceleration of the wheel and axle units at a rate exceeding a certain rate, such as ten miles per hour per second, which occurs only when the associated wheel 2 slips, for effecting unseating of the pilot valve devices 10.

The term "slip" as used herein refers to the rotation of a vehicle wheel at a speed different from that corresponding to vehicle or rail speed at a given instant and may be induced either by excessive propulsion torque or excessive braking torque exerted on the wheel. When excessive braking torque is exerted on a wheel it decelerates at an abnormally rapid rate in excess of ten miles per hour per second which rate of deceleration is never attained unless the wheels are actually slipping.

The term "slide" as employed herein in connection with vehicle wheels refers to a non-rotative or locked condition of the wheels as distinct from a "slip" condition in which the wheels are rotating.

It will be understood, therefore, that whenever the vehicle wheels 2 begin to slip the corresponding pilot valve device 10 is unseated to effect a rapid venting to atmosphere and a consequent reduction of the pressure in the chamber 32 of the vent valve portion of the control valve device 6. This initiates a sequence of operation which will be presently explained.

*Operation*

In order to further explain the operation of the control valve device 6, let it be assumed that the operator desires to initiate a brake application while the vehicle having the equipment shown in Figure 1 is traveling under power. After first shutting off propulsion power, the operator shifts the brake valve handle 12 out of its brake release position a desired amount into the brake application zone to cause a fluid pressure to be established in the control pipe 4 corresponding to the desired degree of brake application. With the control pipe 4 charged with fluid under pressure, fluid under pressure flows through the branch pipe 7, passage 19, branch passage 31, annular cavity 30, ports 35, cavity 36, passage 37, past the double check valve element 57, cavity 62, passage 20, and pipe 8 to the brake cylinder 1, the pressure established in the brake cylinder corresponding to that established in the control pipe 4.

The piston valve device 21 remains seated in the position shown in Figure 2 by reason of the sufficiently rapid flow of fluid under pressure through the orifice of the choke fitting 34 to the chamber 32 above the piston valve device 21, which prevents the development of a differential fluid pressure force on the piston valve device 21 sufficient to overcome the downwardly exerted force of the spring 27. At the same time, fluid under pressure supplied through the orifice of the choke fitting 34 flows through the passage 18 and charges the pilot valve pipe 11 to a corresponding pressure.

As previously indicated, the pressure of the fluid supplied through the pipe 7 from the control pipe 4 to the passage 19 acts on the upper face of the piston valve device 73 but the piston valve device 73 is not unseated downwardly by reason of the simultaneous rapid flow of fluid at a corresponding pressure from the passage 37 past the check valve 68 to the chamber formed at the back of the piston valve device 73. It will be understood that the volume chamber 86 is simultaneously charged along with the chamber at the back of the piston valve device 73.

So long as the wheels 2 do not begin to slip due to the brake application, the parts of the control valve device 6 remain in the positions in which they are shown in Figure 2. Thus the pressure in the brake cylinder may be varied in correspondence with variations of the pressure in the control pipe 4 to either increase or decrease the degree of brake application on the wheels 2.

Should one of the wheel units begin to slip at the time a brake application is initiated or during a brake application, operation of the control valve device 6 is effected in the manner which will now be described. The unseating of the pilot valve device 10 of the "Decelostat" 9 associated with the slipping wheel unit effects a rapid reduction of the pressure in the chamber 32 above the piston valve device 21 of the vent valve portion 15. Due to the restricted orifice in the choke fitting 34, the pressure in the chamber 32 reduces at a relatively rapid rate whereas the pressure in the annular chamber 30 reduces at a relatively slow rate. Accordingly, a sufficient differential fluid pressure is promptly built-up on the piston valve device 21 to overcome the downward force of spring 27 and cause shifting of the piston valve device 21 upwardly into contact with the contact face of the cap section 17.

In its upper position, the piston valve device 21 closes off the connection between passage 19 and passage 37, thus preventing the further supply of fluid under pressure to the brake cylinder 1. At the same time, passage 37 is connected past the piston valve 24 of the piston valve device to the atmospheric exhaust port 29. Fluid under pressure is thus vented at a rapid rate from the brake cylinder, thereby correspondingly reducing the degree of the brake application at a rapid rate.

When fluid under pressure is supplied to the brake cylinder in excess of a certain degree the pressure active in the passage 38 on the inner seated area of the valve 39 unseats the valve upwardly in opposition to the force of the spring 47. Brake cylinder pressure accordingly becomes active in the chamber 42 on the lower face of the diaphragm 43, thereby causing a force to be exerted on the diaphragm for raising the piston follower 46 in opposition to the force of the spring 47 sufficiently to permit the spring 41 to maintain the valve 39 unseated. Accordingly, when the valve 51 is unseated by the piston valve device 21 in its traverse to its upper position, the chamber 32 is connected to atmosphere past the valve 51 and the valve 39, passage 38, chamber 36, ports 35, and exhaust port 29. Thus, once the piston valve device 21 is actuated to its upper position, the reduction of the fluid pressure in the chamber 32 thereafter continues at a rapid rate independently of the reduction of the pressure in the pilot valve pipe 11, until such time as the pressure in the brake cylinder reduces sufficiently low, for example to 18 pounds per square inch, to enable the force of the spring 47 to effect the reseating of the valve 39.

Due to the prompt and rapid reduction of the pressure in the brake cylinder, the slipping wheels cease to decelerate and begin to accelerate back toward a speed corresponding to vehicle speed without actually reducing in speed to a locked condition. In most instances, the slipping wheels will have been restored to vehicle speed and again attain the rate of deceleration corresponding to the rate of retardation of the train before the pressure in the brake cylinder will have reduced sufficiently to effect the reseating of the valve 39.

When the valve 39 is reseated, the reduction of the pressure in the chamber 32 is accordingly terminated by reason of the fact that the pilot valve device 10 of "Decelostat" 9 associated with the slipping wheels has already reclosed due to the restoration of the wheel to the normal rate of deceleration. The piston valve device 21 will thus be promptly restored downwardly by the spring 27 to the position in which it is shown in Figure 2 by reason of the restoration of the balance of fluid pressure forces thereon by the supply of fluid under pressure to the chamber 32 through the restricted orifice of the choke fitting 34. The time interval that elapses between the seating of the valve 39 and the restoration of the piston valve device 21 to its lower position in which it is shown in Figure 2 may be such that the pressure in the brake cylinder actually reduces to a low value, such as five pounds per square inch.

Upon the restoration of the piston valve device 21 to its lower position, therefore, it cuts off the reduction of the pressure in the brake cylinder and establishes the communication between the passage 19 and the passage 37 through which fluid under pressure is again supplied to the brake cylinder to effect a corresponding reapplication of the brakes on the particular wheel truck involved.

While the pressure of the fluid in the brake cylinder is being reduced by operation of the vent valve portion 15 as just described, the pressure in the control pipe 4 and consequently in the branch pipe 7 and passage 19 may tend to reduce due to flow of fluid under pressure through the restricted orifice of the choke fitting 34. Moreover, when fluid under pressure is resupplied to the brake cylinder from the control pipe 4, the pressure in the control pipe also tends to reduce. However, due to the pressure-maintaining feature of the brake valve 5, the pressure in the control pipe 4, pipe 7 and passage 19 remains substantially unreduced so long as the position of the brake valve handle 12 is not changed.

It will be apparent, therefore, that the pressure in the control pipe 4 remains active on the upper face of the piston valve device 73 of the auxiliary portion 16 while the pressure in the brake cylinder is being reduced. It will also be seen that while the pressure in the brake cylinder is being reduced past the piston valve 24 of the piston valve device 21, the fluid pressure in the volume chamber 86 and in the chamber at the back of the piston valve device 73 is also reducing at a controlled rate by reason of the exhaust of fluid under pressure therefrom through the restricted orifice of the choke fitting 88 into passage 37 and thence to atmosphere through exhaust port 29. The rate of reduction of the pressure in the volume chamber 86 is so controlled by the size of the orifice in the choke fitting 88, however, that a certain length of time is required in order to reduce the pressure sufficiently at the back of the piston valve device 73 to create a pressure differential force effective to overcome the force of spring 74 and shift the piston valve device 73 downwardly to its lowermost position. This interval of time is such that under normal circumstances the resupply of fluid under pressure to the brake cylinder 1, due to restoration of the piston valve device 21 to its normal or lowermost position as shown in Figure 2, will occur before the expiration of such time.

Consequently, if the vent valve portion 21 of the control valve device 6 operates in the normal and intended manner, the piston valve device 73 will remain in the upper position in which it is shown in Figure 2.

Let it be assumed, however, that while a brake application is being effected the pilot valve pipe 11 is ruptured, thereby effecting a rapid reduction of the pressure in the chamber 32 of the vent valve portion 15 in exactly the same manner as if a pilot valve device 10 had unseated. In this instance, piston valve device 21 is operated in exactly the same manner previously described to effect a reduction of the pressure in the brake cylinder 1. Due to the rupture of the pilot valve pipe 11, however, the chamber 32 above the piston valve device 21 cannot be recharged. Thus piston valve device 21 will continue to be held in its upper position by the differential fluid pressure force acting on the piston valve device 21. Accordingly, the pressure in the brake cylinder 1 is completely exhausted and except for the intervention of the auxiliary portion 16 would cause an undesired continued release of the brakes on the wheel truck controlled by the control valve device 6.

Upon the elapse of the required interval of time, however, the pressure in the volume chamber 86 reduces sufficiently that the pressure differential thereby created on the piston valve device 73 becomes effective to overcome the force of the spring 74 and shift the piston valve device 73 downwardly to its lower seated position in which it cuts off the connection between the passage 79 and the atmospheric exhaust port 78 and at the same time connects the passage 19 to the passage 79.

Fluid at the relatively high pressure maintained in the control pipe 4 is thus supplied to the right-hand face of the double check valve element 57, which is correspondingly shifted in the left-hand direction into seated relation on the gasket seat 59, the relatively low pressure acting on the left-hand face of the double check valve element 57 at such time being insufficient to prevent such movement of the valve element. With the double check valve element 57 in its left-hand position, communication is established therepast from the passage 79 through the cavity 62 to the passage 20 and pipe 8 leading to the brake cylinder 1.

It will thus be seen that if the vent valve portion 15 does not operate in its normal intended manner to effect a resupply of fluid under pressure to the brake cylinder and a consequent reapplication of the brakes within a certain interval of time, the auxiliary portion 16 of the control valve device 6 functions automatically to cause the supply of fluid under pressure directly from the control pipe 4 to the brake cylinder independently of the vent valve portion 15.

The brakes are thus reapplied on the wheels of the affected wheel truck and remain so during the remainder of the brake application, although of course the wheel slip protection feature is lost. However, it is believed preferable from the standpoint of safety to insure a restoration of a brake application even though there is a possibility that the wheels may slide.

After the train comes to a stop, the brakes remain applied due to the continued supply of fluid under pressure past piston valve device 73 to the brake cylinder 1. At the same time, the continued flow of fluid under pressure or venting of fluid under pressure from the ruptured pilot valve pipe 11 will serve as a signal to the crew of the train indicating the faulty condition of the pilot valve pipe so that they may take suitable steps to correct the condition.

When it is again desired to proceed, the brakes on the train may be released merely by restoring the brake valve handle 12 to the brake release position. Fluid under pressure will be vented from the brake cylinder 1 in accordance with the reduction of the pressure in the control pipe 4, reversely past the piston valve device 73 until such time as the force of spring 74 becomes effective to shift the piston valve 73 upwardly to its upper seated position closing off the communication between the passage 19 and passage 79. Due to the reduction of the pressure in the control pipe 4, the pressure in the annular chamber 30 acting on the piston valve device 21 of the vent valve portion 15 will correspondingly reduce to the point where the spring 27 will become effective to restore the piston valve device 21 downwardly to the seated position in which it is shown in Figure 2. Thus the exhaust communication for the brake cylinder through the exhaust port 29 will be closed and the communication through which fluid under pressure may again be supplied to the brake cylinder correspondingly established.

Thus, after the piston valve device 21 is restored to its normal position in which it is shown in Figure 2, the remaining fluid under pressure in the brake cylinder will be released to atmosphere reversely from the passage 20 to the passage 37 and thence through the passage 19, pipe 7, control pipe 4, and brake valve exhaust port and pipe 13. It is impossible, therefore, for fluid under pressure to remain trapped in the brake cylinder.

It will be apparent that when the piston valve device 73 is restored to its uppermost position, it reconnects the passage 79 to the atmospheric exhaust port 78. Thus, due to the pressure of the fluid remaining in the passage 37 and volume chamber 86, the double check valve element 57 will be shifted in a right-hand direction to reconnect the passage 20 to the passage 37. It will be understood that with the pressure in the control pipe 4 reduced to atmospheric pressure, the pressure in the volume chamber 86 and the chamber at the back of the piston valve device 73 will ultimately be reduced to atmospheric pressure through the orifice of the choke fitting 88.

It will be seen that if a brake application is subsequently initiated while the pilot valve pipe 11 remains ruptured, the piston valve device 21 of the vent valve portion 15 will be promptly operated to its uppermost position in which the supply of fluid under pressure to the brake cylinder will be terminated and such fluid under pressure as may have been momentarily supplied to the brake cylinder exhausted past the piston valve 24 of the piston valve device 21 and through the exhaust port 29. In such case, therefore, there will be very little, if any, fluid under pressure supplied past the check valve 68 to charge the chamber at the back of the piston valve device 73 and the volume chamber 86. Thus a sufficient differential fluid pressure force will be promptly built-up on the piston valve device 73 to shift it downwardly to its lowermost position so as to establish the necessary communication between the passage 19 and the passage 79 through which fluid under pressure is supplied directly from the control pipe 4 to the brake cylinder 1.

Upon a subsequent release of the brakes, piston valve device 73 will be restored to its normal upper position and the piston valve device 21 will be restored to its normal lower position, in which they are shown in Figure 2.

Thus assuming that the pilot valve pipe 11 is allowed to remain ruptured, the parts of the control valve device 6 continues to cycle, that is operate each time a brake application is effected and released. This is a desirable feature in that it tends to prevent possible sticking of the piston valve devices 21 and 73 due to non-operation.

*Figure 3*

In Figure 3 there is shown an arrangement wherein a cover plate 90 is attached to the face of the pipe bracket portion 14 in place of the auxiliary portion 16 if for any reason it is desired to eliminate the features contributed by the auxiliary portion 16. It will be observed that the cover plate 90 has a passage 91 therein which connects the ends of passage 37 and passage 20 in the pipe bracket portion 14, thereby providing direct flow of fluid under pressure from the passage 37 to the brake cylinder 1. The open end of passage 19 is at the same time sealed off by the sealing gasket interposed between the cover plate 90 and the pipe bracket portion 14.

With the cover plate 90 installed in place of the auxiliary portion 16, the control valve device 6 functions exactly as previously described except that it lacks the protective feature provided by the auxiliary portion 16 for insuring an application of the brakes notwithstanding rupture of the pilot valve pipe 11.

Having now described my invention, what I claim as new and desire to secure by Letters Patent is:

1. The combination of a fluid pressure differential operated valve device having a normal position in which it establishes a communication through which fluid under pressure may be supplied to a fluid pressure receiving device and operative to a different position in which said communication is cut off and an exhaust communication is established through which fluid under pressure is released from the fluid pressure receiving device at a rapid rate, means controlling the fluid pressure differential active on said valve device in such a manner that the said valve device is operated out of its normal position to its different position and back to its normal position within a certain length of time under normal circumstances, auxiliary valve means normally in a position preventing the supply of fluid under pressure therepast to the fluid pressure receiving device and operative to a different position establishing a communication through which fluid under pressure may be supplied to the fluid pressure receiving device; a volume chamber chargeable concurrently with the charging of the fluid pressure receiving device and having fluid under pressure released therefrom while the said valve device is out of its normal position, means for preventing reduction of pressure in said volume chamber except at a certain rate less than the said rapid rate of reduction of the pressure in the receiving device simultaneously effected under the control of the said valve device, and fluid pressure responsive means subject in opposing relation to the pressure of fluid supplied to the said valve device and to the pressure in said volume chamber and being effective to operate said auxiliary valve means to a position establishing the communication through which fluid under pressure is supplied therepast to the receiving device only upon a predetermined reduction of the pressure in the volume chamber relative to the pressure of the fluid supplied to the said valve device.

2. The combination of a vent valve device having a normal position in which it establishes a supply communication through which fluid under pressure may be supplied from a source to a fluid pressure receiving device and adapted to be operatively controlled through a fluid pressure communication that is subject to undesired rupture, said vent valve device being normally operative out of its normal position to a different position cutting off said supply communication and establishing an exhaust communication through which fluid under pressure is released from the fluid pressure receiving device and then restored to its normal position within a certain length of time so long as said fluid pressure communication is not ruptured but adapted to be maintained in its different position upon rupture of said fluid pressure communication, auxiliary valve means operative to effect the supply of fluid under pressure from said source to said fluid pressure receiving device notwithstanding said valve device remaining in its said different position, and timing means effective when said valve device remains out of its normal position longer than said certain length of time for effecting operation of said auxiliary valve means.

3. For use in connection with a pipe chargeable with fluid at different pressures and a fluid pressure receiving device, the combination of a vent valve device having a normal position establishing communication through which fluid under pressure may be supplied from the said pipe to the said receiving device and operative to a different position cutting off said communication and establishing an exhaust communication through which fluid under pressure is released from the receiving device, means controlling the operation of said valve device to effect operation of the valve device out of its normal position to its different position and back to its normal position again within a certain length of time under normal circumstances, a volume chamber to which fluid under pressure is supplied and from which fluid under pressure is released under the control of said vent valve device concurrently with the supply of fluid under pressure to and the release of fluid under pressure from the receiving device, means for restricting the rate of release of fluid under pressure from said volume chamber to a rate less than the rate of release of fluid under pressure from the receiving device, and fluid pressure operated valve means subject in opposing relation to the pressure of fluid supplied from said pipe and to the pressure of the fluid in said volume chamber and operative in response to a predetermined reduction of the pressure in the volume chamber with respect to that in the said pipe for establishing a communication through which fluid under pressure may be supplied from said pipe to said receiving device notwithstanding said vent valve device being in its said different position.

4. The combination of a fluid pressure controlled valve device having a normal position in which it establishes a communication through which fluid under pressure may be supplied to a fluid pressure receiving device and operative to a different position in which the said communication is cut off and an exhaust communication is established through which fluid under pressure is released from the receiving device, auxiliary valve means operative from one position in which it prevents the supply of fluid under pressure therepast to the fluid pressure receiving device to a different position establishing a communication through which fluid under pressure may be supplied therepast to the fluid pressure receiving device, fluid pressure responsive means subject in substantially balanced relation to the opposing forces of fluid under pressure being supplied to the fluid pressure receiving device whereby to cause said auxiliary valve means to remain in its said one position, and timing means set in operation by operation of the fluid pressure controlled valve device out of its normal position to its said different position for creating a predetermined unbalance of fluid pressure forces on said fluid pressure responsive means upon the expiration of a certain interval of time whereby to cause said fluid pressure responsive means to operate said auxiliary valve means to its said different position.

5. The combination of a fluid pressure controlled valve device having a normal position in which it establishes a communication through which fluid under pressure may be supplied to a fluid pressure receiving device and operative to a different position in which the said communication is cut off and an exhaust communication is established through which fluid under pressure is released from the receiving device, auxiliary valve means operative from one position in which it prevents the supply of fluid under pressure therepast to the fluid pressure receiving device to a different position establishing a communication through which fluid under pressure may be supplied therepast to the fluid pressure receiving device, spring means effective to yieldingly bias said auxiliary valve means to its said one position, fluid pressure responsive means subject in substantially balanced relation to the opposing forces of fluid under pressure being supplied to the fluid pressure receiving device and effective upon a predetermined unbalance of fluid pressure forces acting thereon to effect operation of said auxiliary valve means to its said different position, and timing means set in operation by operation of the fluid pressure controlled valve device out of its normal position to its said different position for effecting said predetermined unbalance of the fluid pressure forces acting on the fluid pressure responsive means upon the expiration of a certain interval of time following the operation of said fluid pressure controlled valve device out of its normal position to its said different position unless the fluid pressure controlled valve device is restored to its said normal position within said certain interval of time.

6. The combination of a fluid pressure controlled valve device having a normal position in which it establishes a communication through which fluid under pressure may be supplied to a fluid pressure receiving device and operative to a different position in which the said communication is cut off and an exhaust communication is established through which fluid under pressure is released from the receiving device, auxiliary valve means operative from one position in which it prevents the supply of fluid under pressure therepast to the fluid pressure receiving device to a different position establishing a communication through which fluid under pressure may be supplied therepast to the fluid pressure receiving device, fluid pressure responsive means subject in substantially balanced relation to the opposing forces of fluid under pressure being supplied to the fluid pressure receiving device whereby to cause said auxiliary valve means to remain in its said one position, timing means set in operation by operation of the fluid pressure controlled valve device out of its normal position to its said different position for creating a predetermined unbalance of fluid pressure forces on said fluid pressure responsive means upon the expiration of a certain interval of time whereby to cause said fluid pressure responsive means to operate said auxiliary valve means to its said different position, and means for preventing release of fluid under pressure from the receiving device by said valve device while said auxiliary valve means is in its said different position in which fluid under pressure is being supplied therepast to the receiving device.

7. The combination of a fluid pressure controlled valve device having a normal position in which it establishes a communication through which fluid under pressure may be supplied to a fluid pressure receiving device and operative to a different position in which the said communication is cut off and an exhaust communication is established through which fluid under pressure is released from the receiving device, auxiliary valve means operative from one position in which it prevents the supply of fluid under pressure therepast to the fluid pressure receiving device to a different position establishing a communication through which fluid under pressure may be supplied therepast to the fluid pressure receiving device, fluid pressure responsive means subject in substantially balanced relation to the opposing forces of fluid under pressure being supplied to the fluid pressure receiving device whereby to cause said auxiliary valve means to remain in its said one position, timing means set in operation by operation of the fluid pressure controlled valve device out of its normal position to its said different position for creating a predetermined unbalance of fluid pressure forces on said fluid pressure responsive means upon the expiration of a certain interval of time whereby to cause said fluid pressure responsive means to operate said auxiliary valve means to its said different position, and a double check valve device operatively responsive to the supply of fluid under pressure to the receiving device under the control of said auxiliary valve means for preventing release of fluid under pressure from the receiving device by said fluid pressure controlled valve device.

8. The combination of a fluid pressure operated valve device having a control chamber the pressure in which is adapted to be varied under normal circumstances in a manner to cause operation of said fluid pressure operated valve device out of a certain normal position to a different position and back to said normal position within a certain length of time, said fluid pressure operated valve device being effective in its normal position to establish a communication through which fluid under pressure may be supplied to a fluid pressure receiving device and effective in its different position to cut off the supply of fluid under pressure to the fluid pressure receiving device and effect the release of fluid under pressure therefrom, auxiliary valve means having a certain normal position in which it prevents the supply of fluid under pressure therepast to the fluid pressure receiving device and operative to a different position in which it causes fluid under pressure to be supplied therepast to the fluid pressure receiving device, fluid pressure responsive means subject in substantially balanced relation to the opposing forces of fluid under pressure being supplied to the fluid pressure receiving device and effective upon the creation of a certain predetermined unbalanced relation of the opposing forces of fluid under pressure acting thereon to effect operation of said auxiliary valve means to its said different position, and means controlled by the said fluid pressure operated valve device for causing said predetermined unbalanced relation of the opposing forces of fluid under pressure acting on said fluid pressure responsive means upon the expiration of a certain interval of time longer than said certain length of time whereby to cause operation of said auxiliary valve means only if the said fluid pressure operated valve device remains out of its normal position longer than said certain length of time.

9. The combination of a fluid pressure controlled vent valve device adapted to be operatively controlled through a piloting communication subject to undesired rupture, said vent valve device having a normal position in which it establishes communication through which fluid under pressure may be supplied from a source of fluid pressure to a fluid pressure receiving device and effective, upon operation, to a different position to cut off said communication and establish an exhaust communication through which fluid under pressure is released from the fluid pressure receiving device, said vent valve device being operative promptly to its said different position in response to the supply of fluid under pressure to the fluid pressure receiving device if the piloting communication is ruptured at the time, auxiliary valve means having a certain normal position in which it prevents the supply of fluid under pressure therepast to the fluid pressure receiving device and being operative to a different position in which it causes fluid under pressure to be supplied to the fluid pressure receiving device, fluid pressure responsive means adapted to be subject to an unbalanced fluid pressure force for operating said auxiliary valve means promptly to its said different position in the event that said fluid pressure controlled vent valve device is operated to its said different position promptly upon the supply of fluid under pressure to said fluid pressure receiving device.

ADELBERT A. STEINMILLER.

REFERENCES CITED

The following references are of record in the file of this patent:

UNITED STATES PATENTS

| Number | Name | Date |
|---|---|---|
| 2,218,619 | McNeal | Oct. 22, 1940 |